US010725759B2

(12) United States Patent
Tanabe et al.

(10) Patent No.: US 10,725,759 B2
(45) Date of Patent: Jul. 28, 2020

(54) WEB APPLICATION SYSTEM AND METHOD TO DYNAMICALLY SELECT BETWEEN LOCAL INSTALLED AND CLOUD-BASED RESOURCES

(71) Applicant: Avaya Inc., Santa Clara, CA (US)

(72) Inventors: Jason Tanabe, Kanata (CA); Udi Arie, Pardesia (IS); Stephen McIntyre, Kanata (CA); Jing Xie, Princeton, NJ (US)

(73) Assignee: Avaya Inc., Santa Clara, CA (US)

( * ) Notice: Subject to any disclaimer, the term of this patent is extended or adjusted under 35 U.S.C. 154(b) by 87 days.

(21) Appl. No.: 15/284,202

(22) Filed: Oct. 3, 2016

(65) Prior Publication Data

US 2018/0095741 A1    Apr. 5, 2018

(51) Int. Cl.
*G06F 9/445* (2018.01)
*G06F 8/61* (2018.01)
*H04L 29/08* (2006.01)
*G06F 9/50* (2006.01)
*G06F 8/65* (2018.01)

(52) U.S. Cl.
CPC .............. *G06F 8/61* (2013.01); *G06F 8/65* (2013.01); *G06F 9/505* (2013.01); *H04L 67/303* (2013.01); *H04L 67/34* (2013.01)

(58) Field of Classification Search
CPC ........ H04L 67/30; H04L 67/303; H04W 8/22; H04W 8/24; G06F 9/50; G06F 9/505; G06F 9/5027–5055; G06F 8/61; G06F 8/65; G06F 9/5055
See application file for complete search history.

(56) References Cited

U.S. PATENT DOCUMENTS

| | | | | |
|---|---|---|---|---|
| 6,832,241 B2* | 12/2004 | Tracton | ................... | H04L 29/06 709/203 |
| 7,454,458 B2* | 11/2008 | Islam | ...................... | G06F 9/505 709/203 |
| 7,548,977 B2* | 6/2009 | Agapi | ..................... | G06F 9/505 370/235 |
| 7,567,359 B2* | 7/2009 | Tameshige | ............ | G06F 9/5055 358/1.15 |
| 7,617,273 B2* | 11/2009 | Rocchetti | .............. | G06F 9/5044 709/203 |

(Continued)

OTHER PUBLICATIONS

W3C. "HTTP: The Request". Archived by Internet Archive on Apr. 12, 2010. Retrieved from https://web.archive.org/web/20100412074124/ http://www.w3.org/Protocols/HTTP/Request.html on Aug. 19, 2018.*

*Primary Examiner* — Hiren P Patel
(74) *Attorney, Agent, or Firm* — Sheridan Ross P.C.

(57) ABSTRACT

The embodiments herein are directed to collecting information from multiple sources about platform capabilities and evaluating the platform capabilities of at least a requesting computer system and a server. A portal can automatically and dynamically select a proper client/application to handle communication based on availability, connectivity and more characteristics and provide a communication recommendation when requesting a function. Logic in the portal allows the portal to determine how best to set up execution of the function. The portal logic can essentially evaluate all of the options available and then choose the best option.

20 Claims, 13 Drawing Sheets

(56) References Cited

U.S. PATENT DOCUMENTS

| | | | | |
|---|---|---|---|---|
| 8,572,623 | B2* | 10/2013 | Bhogal | G06F 9/45558 |
| | | | | 718/104 |
| 8,725,874 | B2* | 5/2014 | Keohane | H04L 67/14 |
| | | | | 709/224 |
| 9,047,155 | B2 | 6/2015 | Dehaan | |
| 9,258,625 | B2* | 2/2016 | Martin | H04N 21/6582 |
| 9,742,858 | B2* | 8/2017 | Holland | H04L 67/2804 |
| 10,032,027 | B2* | 7/2018 | Dogu | H04L 67/06 |
| 10,218,766 | B2* | 2/2019 | Ding | H04L 65/1006 |
| 10,506,262 | B2* | 12/2019 | Ma | H04L 67/18 |
| 10,567,346 | B2* | 2/2020 | Joglekar | H04L 63/0272 |
| 2001/0018709 | A1* | 8/2001 | Kriegsman | H04L 29/06 |
| | | | | 709/226 |
| 2002/0120721 | A1* | 8/2002 | Eilers | G06F 17/30905 |
| | | | | 709/220 |
| 2003/0050973 | A1* | 3/2003 | Tracton | H04L 29/06 |
| | | | | 709/203 |
| 2004/0003029 | A1* | 1/2004 | Islam | G06F 9/505 |
| | | | | 709/203 |
| 2010/0125626 | A1* | 5/2010 | Lucas | H04L 67/1008 |
| | | | | 709/203 |
| 2012/0221603 | A1* | 8/2012 | Kothule | G06F 16/256 |
| | | | | 707/783 |
| 2013/0031527 | A1 | 1/2013 | Granholm et al. | |
| 2013/0166634 | A1* | 6/2013 | Holland | H04L 67/2804 |
| | | | | 709/203 |
| 2014/0181178 | A1* | 6/2014 | Sahoo | G06F 9/505 |
| | | | | 709/203 |
| 2015/0019700 | A1 | 1/2015 | Masterson et al. | |
| 2015/0196841 | A1* | 7/2015 | Lee | A63F 13/355 |
| | | | | 463/42 |
| 2016/0259660 | A1* | 9/2016 | Gaurav | G06F 9/45558 |
| 2016/0294797 | A1* | 10/2016 | Martin | H04L 63/0236 |
| 2016/0299957 | A1* | 10/2016 | Charan | G06F 16/254 |
| 2017/0206189 | A1* | 7/2017 | Houle | G06F 17/30905 |

* cited by examiner

WEB APPLICATION SYSTEM AND METHOD TO DYNAMICALLY SELECT BETWEEN LOCAL INSTALLED AND CLOUD-BASED RESOURCES

SUMMARY

In accordance with embodiments of the present disclosure, systems and methods are presented for determining and executing applications either locally or remotely based on the capabilities of the remote server and the local device. Embodiments include the process of a local client sending a request to a server for some type of functionality. The server can respond with an instruction or code to install a capabilities application on the local client or device. The device may then install the capabilities application and respond back to the server with information about the devices capabilities. For example, the device may present information on the type of operating system that is executing on the device, the browser type and version executing, one or more applications that may be installed on the device and the versions of those applications, and other information.

From the information provided by the device, the server can determine whether the applications and other software installed on the device are up to date. Further, the server can determine whether to execute the request for functionality or resources either at the device or at the server based on a comparison of the current context or situation of the device compared to the server. From that determination, the server can send a uniform resource identifier (URI) or uniform resource locator (URL) to the device that can be used by the device to call up the resource (associated with the functionality) to be used by the device. The resource to be used can be executed either at the server or the local device. The device may then use the URI to obtain the resource and to fulfill the request originally sent. This process provides the most up-to-date version of the resource and the best environment to execute that resource for the current situation or context. Accordingly, it is these and other advantages that will be apparent from the disclosure.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below.

BRIEF DESCRIPTION OF THE DRAWINGS

The present disclosure is described in conjunction with the appended Figs..

Figure 1:
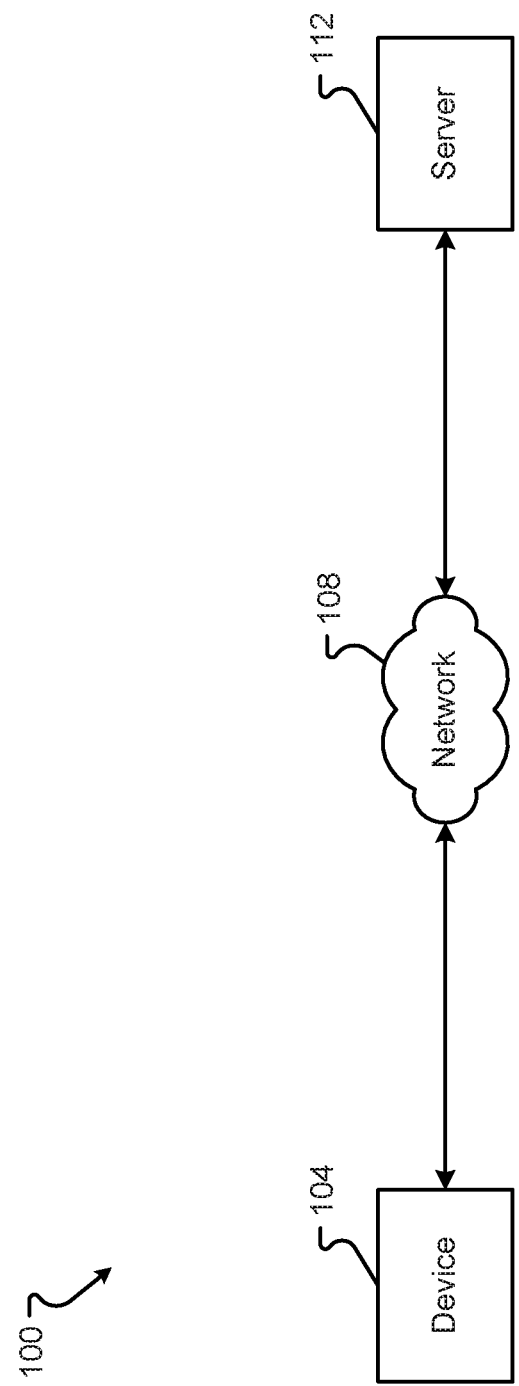
FIG. 1 depicts an embodiment of a system for providing resources either at a device or a server.

In the appended Figs., similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

The disclosure herein is illustrated below in conjunction with an exemplary communication system. Although well suited for use with a system using a server(s) and/or database(s), for example, the embodiments of the disclosure are not limited to a use with any particular type of communication system or configuration of system elements. Those skilled in the art will recognize that the disclosed techniques may be used in a communication application in which it is desirable to execute a function.

The exemplary systems and methods will also be described in relation to analysis software, modules, and associated analysis hardware. However, to avoid unnecessarily obscuring the present invention, the following description omits well-known structures, components, and devices that may be shown in block diagram form or are otherwise summarized.

The embodiments herein are directed to collecting information from multiple sources about platform capabilities and evaluating the platform capabilities (e.g., for Web Real-time Communication (WebRTC)). A portal can automatically and dynamically select a proper client/application to handle communication based on availability, connectivity and more characteristics and provide a communication recommendation when joining a conference. Logic in the portal allows the portal to determine how best to set up a call to join a meeting. The call could be an audio/video call using a Session Initiation Protocol (SIP) client (e.g., Avaya Communicator) or using WebRTC. The portal logic can essentially evaluate all of the options available and then choose the best option.

Software within the embodiments can ensure that the correct software is installed on the local device to provide local service. A software application is installed on the device, referred to as the "Capabilities Application," which is responsible for evaluating the software applications installed on the device and communicating with the web server to allow the remote server to evaluate the state of the mobile device and whether any change to the software on the device is required.

When a feature is invoked, the application can evaluate the various options available. During install time or during invocation of a feature, the application (either native installed application or web browser) invokes features using Hypertext Transfer Protocol (HTTP). The service request is posted to the server portion of the web application running behind a web server. The application then uses knowledge of user/admin preferences and the current state of software on the device and other environmental factors to evaluate the correct process to invoke the service.

When the decision is made, the software can trigger execution of the chosen application. With an HTTP/web-based architecture, the web server can return a Uniform Resource Locator (URL) to the client that determines how the client should invoke the requested service. The URL scheme component may be bound to an appropriate software application on the local device such that invocation of the URL locally will result in the desired effect. The http/https scheme is used by applications on most devices to invoke features in a browser (e.g., https://www.google.com).

The process by which an application binds to a URL scheme is understood with modern devices. Given the common use of URLs in web applications, this approach is an ideal way to communicate the decision to choose one service over another on the local device. In an example: 1) an application wants to make a call to the phone number +18001111111 and submits this request to the application server; 2) the application server evaluates the request based on information provided by the capabilities application; 3) the application server instructs the application to make the call using a URL. For example, the application server provides one of: a. tel://+18001111111 //Make a cellular call; b. sip://+18001111111 //Make a SIP call; c. https://example-.com/dial?phone-number=+18001111111 //Make a call using the browser (e.g., WebRTC or other browser-based calling service).

This method can be used in conjunction with URL redirection to provide a more seamless in-browser experience. The browser can request one URL and be automatically redirected to the destination service after the web application has evaluated the options available to provide the requested service.

An embodiment of an environment 100 for conducing the processes and operations described herein may be as shown in FIG. 1. The environment 100 can include a device 104 in communication with the server 112 through a network 108. The device 104 can be any type of computer as described in conjunction with FIGS. 9 and 10. The device 104 can be a personal computer (PC), a mobile device, a laptop, a tablet, or another type of processing or computing device. The server 112 can also be any type of computing or processing system, as described in conjunction with FIGS. 9 and 10. The server 112 can be in communication with one or more devices 104 and provide resources to those several devices. For example, the server 112 may supply processing capability for a cloud-based environment where resources requested by the devices 104 are provided remotely. The server 112 can provide or communicate information or resources through the network 108.

Figure 9:
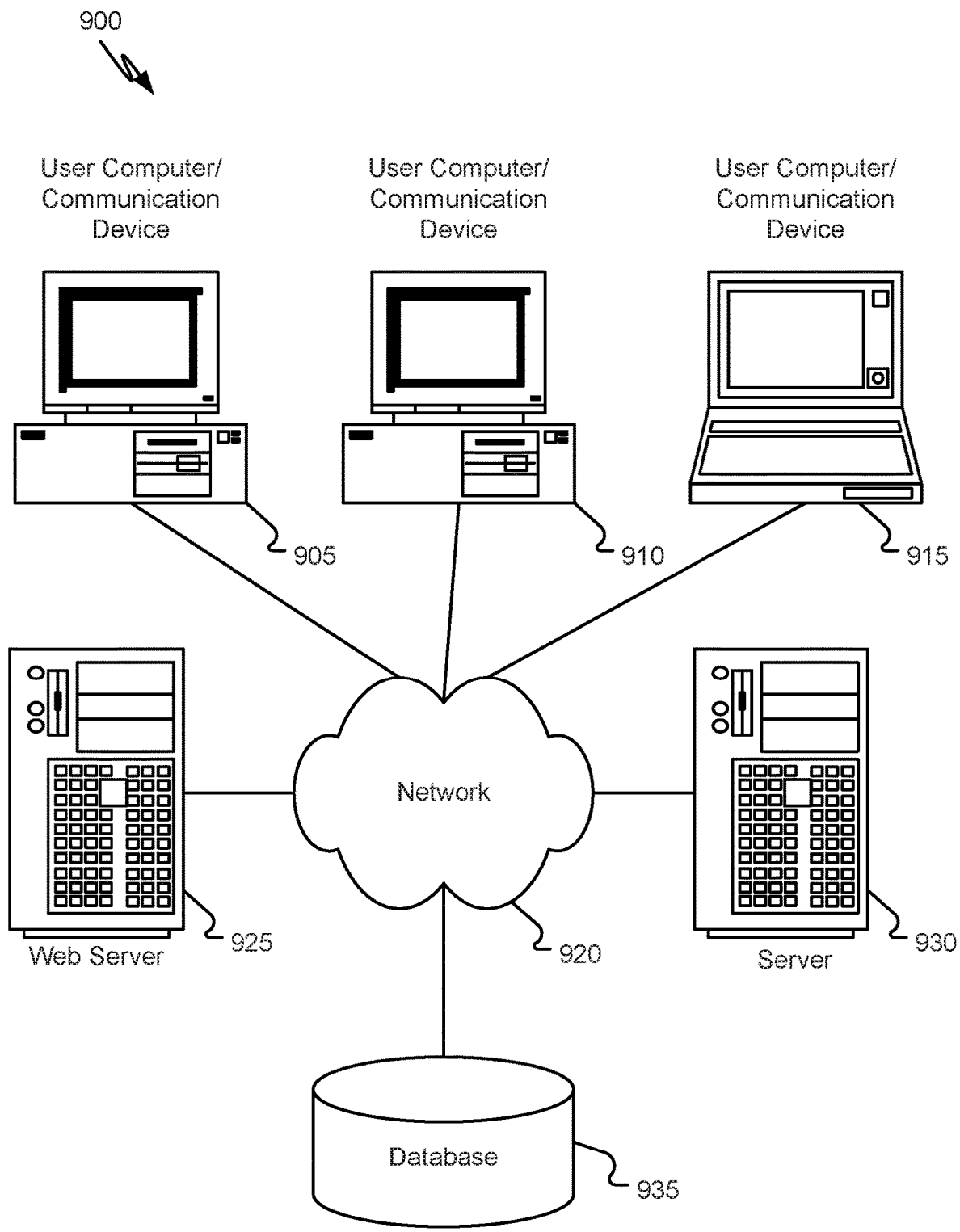
FIG. 9 is a block diagram of a computing environment associated with the embodiments presented herein.
Figure 10:
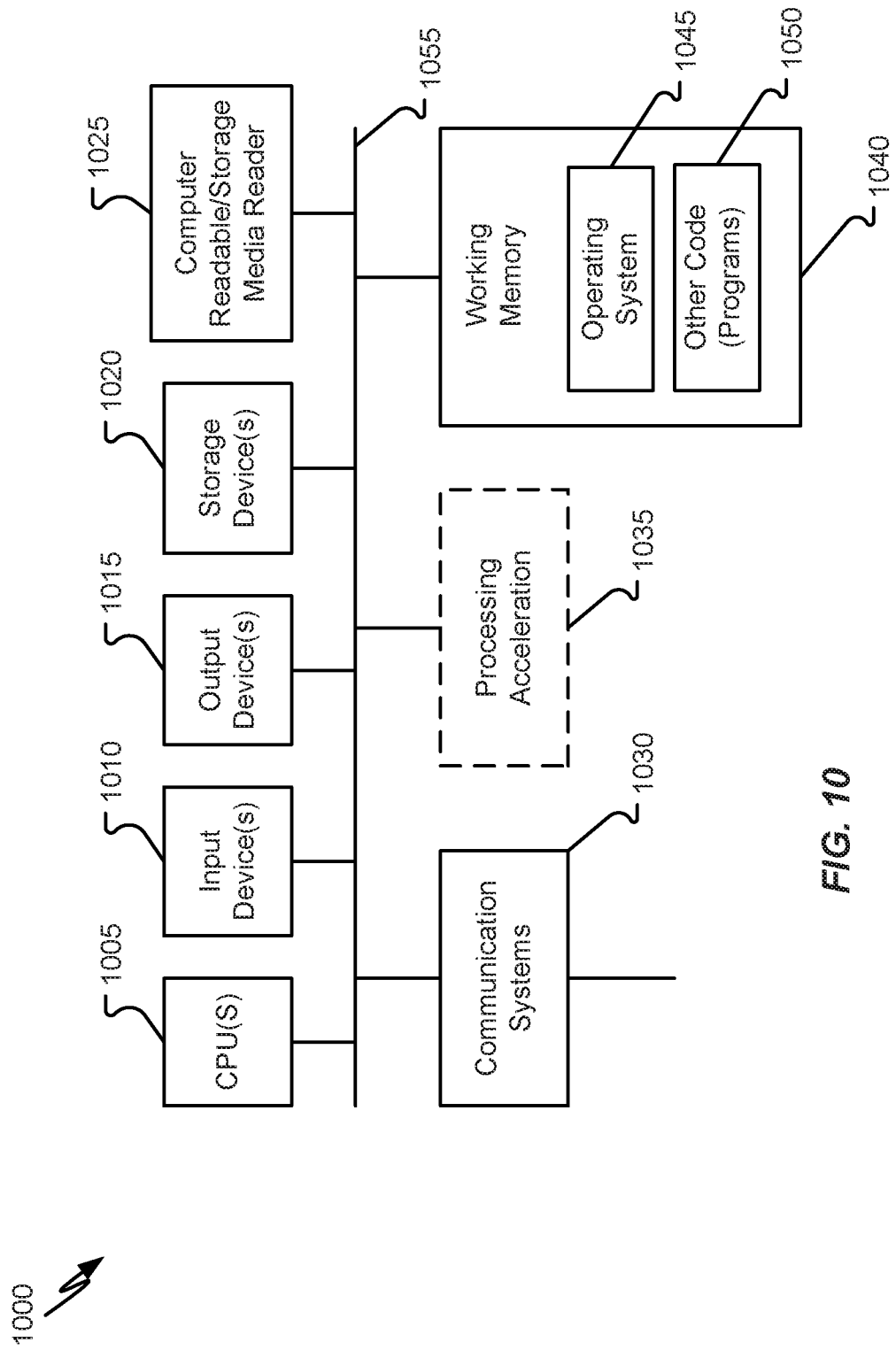
FIG. 10 is a block diagram of a computing device associated with one or more components described herein.

The network 108 may be any type of network, as described in conjunction with FIGS. 9 and 10. The network 108 can include local area networks (LANs), wide area networks (WANs), wireless LANs, and other types of networks either local to the device 104 or server 112 or created between the local networks of the device 104 and server 112. The network 108 may include the Internet, executing the World-Wide Web (WWW), or other types of interfacing networks.

Figure 2A:
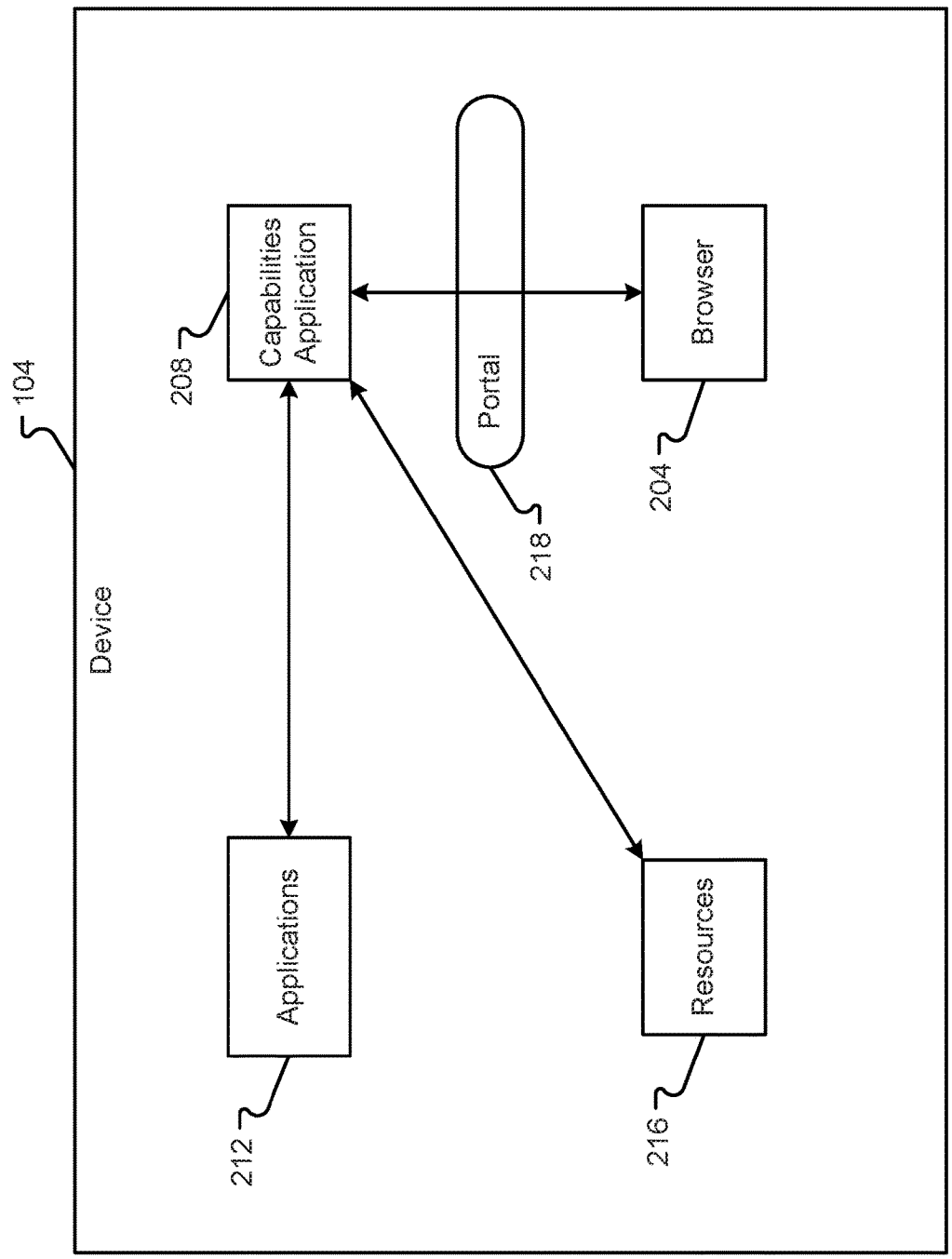
FIG. 2A is a block diagram of an embodiment of a device.
Figure 2B:
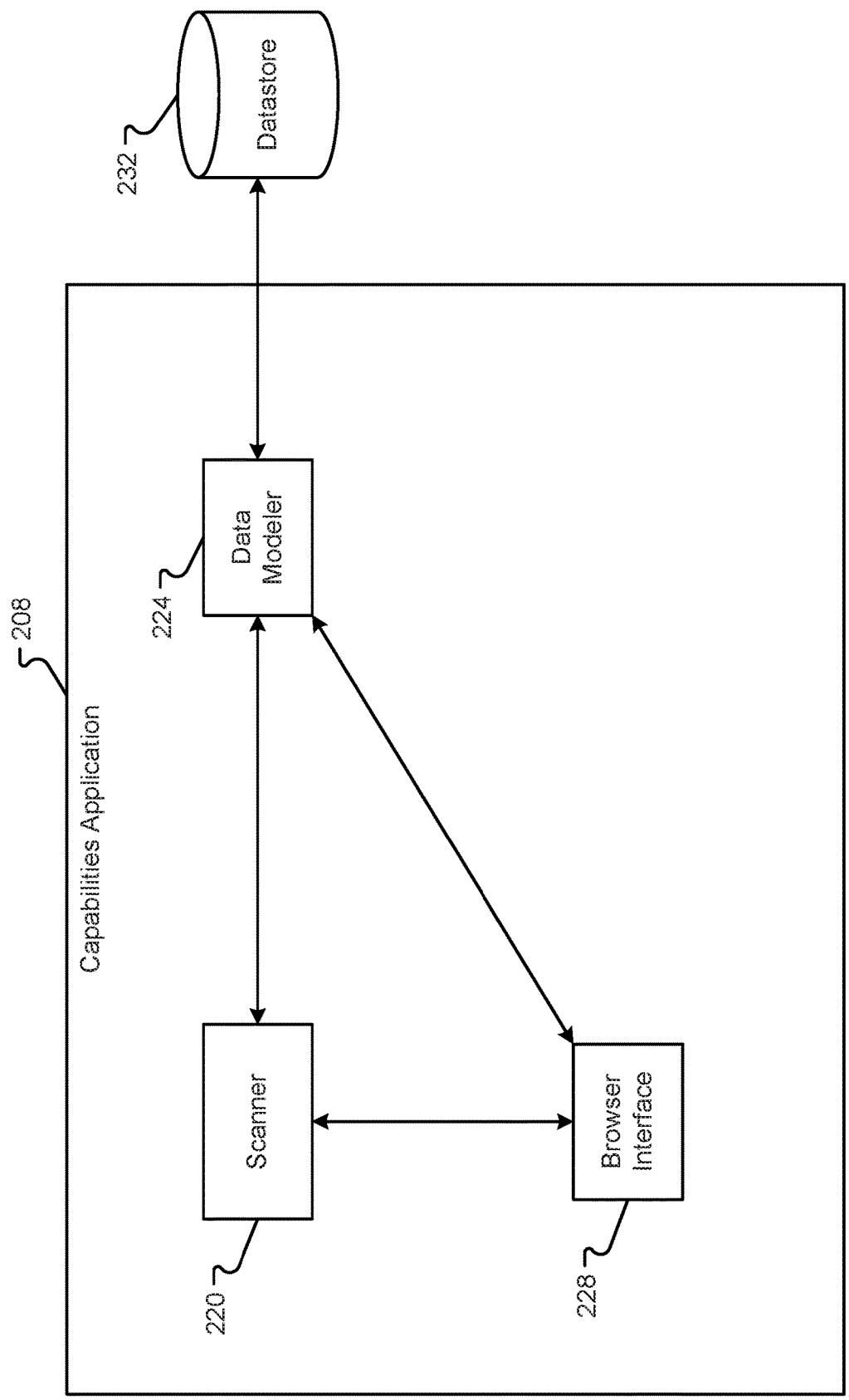
FIG. 2B is a block diagram of a capabilities application install on a device.

Further embodiments of the device 104 may be as shown in FIGS. 2A and 2B. The device 104 can include one or more of, but is not limited to, a browser 204, a capabilities application 208, one or more applications (apps) 212, and/or one or more resources 216. Embodiments of the capabilities application 208 can be a computer software instance and/or hardware that can communicate between the browser 204 and back-end information of the apps 212 and/or resources 216. The capabilities application 208 may be able to communicate or access information about the apps 212 and/or resources 216 by interfacing with the apps 212 and/or resources 216 or gathering information from the operating system (OS) (not shown) and/or files, libraries, etc. associated with the OS. Further, the capabilities application 208 can communicate this information, about the apps 212 and/or resources 216, through a portal 218 to the browser 204. The capabilities application 208 may also interface with the OS of the device 104 for other reasons associated with assessing the capabilities of the device 104. The capabilities application 208 may also be able to interface with the OS for the browser 204 and can communicate information about the device 104 through the network 108 to the server 112.

The apps 212 include any of the computer programs or applications stored on the device 104 and capable for use. The apps 212 can include information about the version and capabilities of the device 104. Resources 216 may also be types of applications or software used to conduct processes. Resources 216, for example, can include types of communication capabilities, types of video capabilities, types of storage, etc., that may not be considered user applications 212, but may conduct processes or provide capabilities to the device 104.

The browser 204 can be any type of interface to the Internet. The browser 204 may be the access point for the device 104 to resources on the server 112. The browser 204 can be, for example, Internet Explorer, Mozilla, etc. The browser 204 may communicate to the capabilities application 208 through a portal 218. The portal 218 can include a communications interface that allows the capabilities application 208 to communicate with the browser 204. The portal 218 may conduct any operations, such as, translating commands, requests, information, into a standard understood by either the capabilities application 208 or the browser 204. Further, the portal 218 provides a directed communication link allowing the browser 204 or capabilities application 208 to send information directly to the other process through a predetermined address.

An embodiment of the capabilities application 208 may be as shown in FIG. 2B. The capabilities application 208 may include one or more of, but not limited to a scanner 220, a data modeler 224, or browser interface 228. The capabilities application 208 may also communicate with a data store 232.

The scanner 220 of the capabilities application 208 may scan the different resources 216 and apps 212. The scanner 220 is capable of determining types of apps 212 and resources 216 available on the device 104, determining versions for the apps 212 and resources 216, and scanning for other metadata that may be used by the capabilities application 208 or the server 112 to determine the most optimal environment to execute a process. This information from the scanner 220 may be provided to the data modeler 224.

The data modeler 224 can take the metadata from the scanner 220 and store the data in a predetermined format in the data store 232. The data modeler 224, thus, is able to organize the data and store such data in the data store 232 for later retrieval in a format explained hereinafter. The data modeler 224 may retrieve the data from the data store 232 and provide that data to the browser interface 228. The browser interface 228 is capable of communicating through the portal 218 to the browser 204. Thus, when the browser 204 provides a directive from the server to provide information about the capabilities of the device 104, the capabilities application 208 may receive this directive through the browser interface 228 and obtain the data from the data modeler 224. The data may then be packaged in a communication packet and sent from the browser interface 228 through the portal 218 back to the browser 204 for communication to the server 112.

Figure 3A:
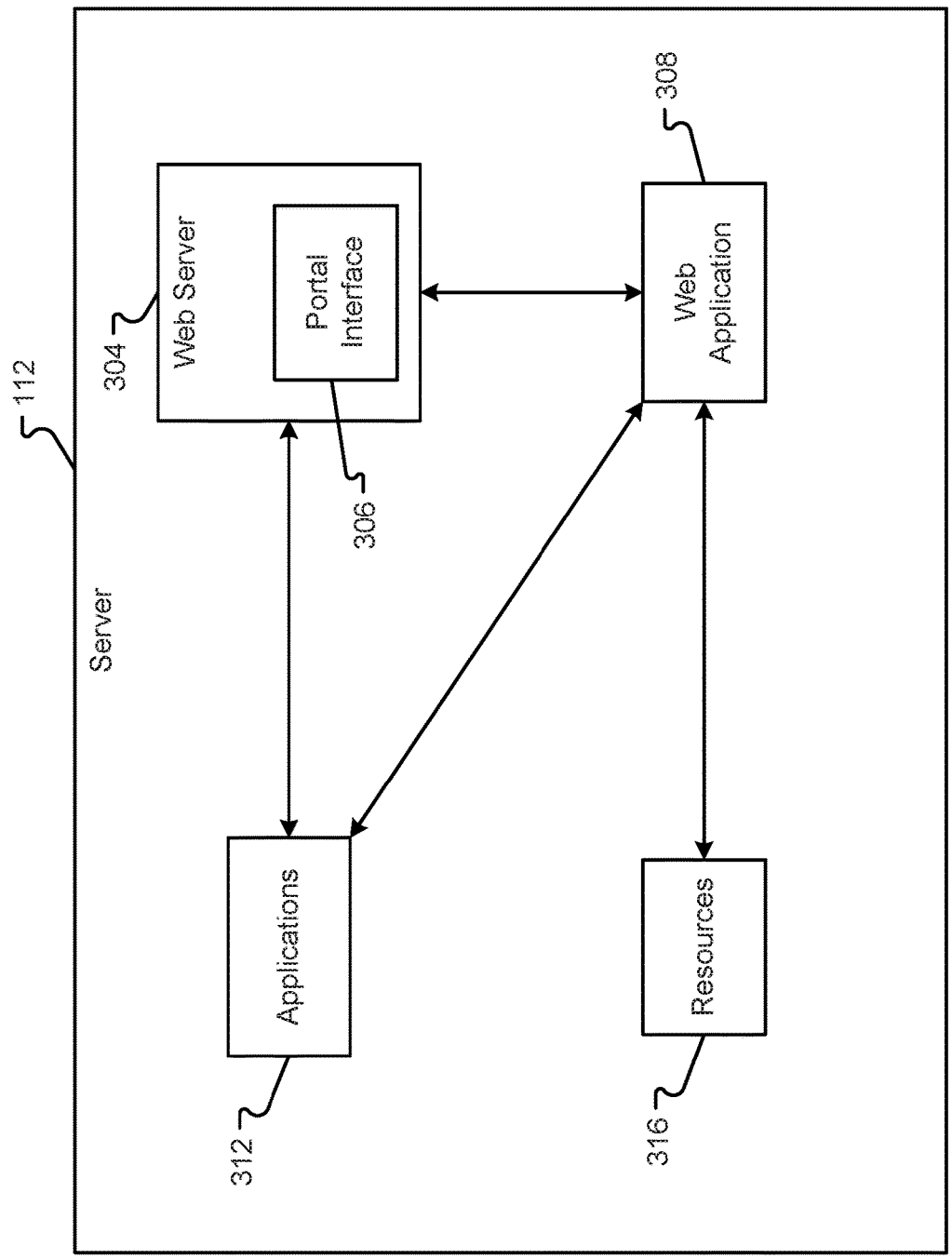
FIG. 3A is a block diagram of an embodiment of a server.
Figure 3B:
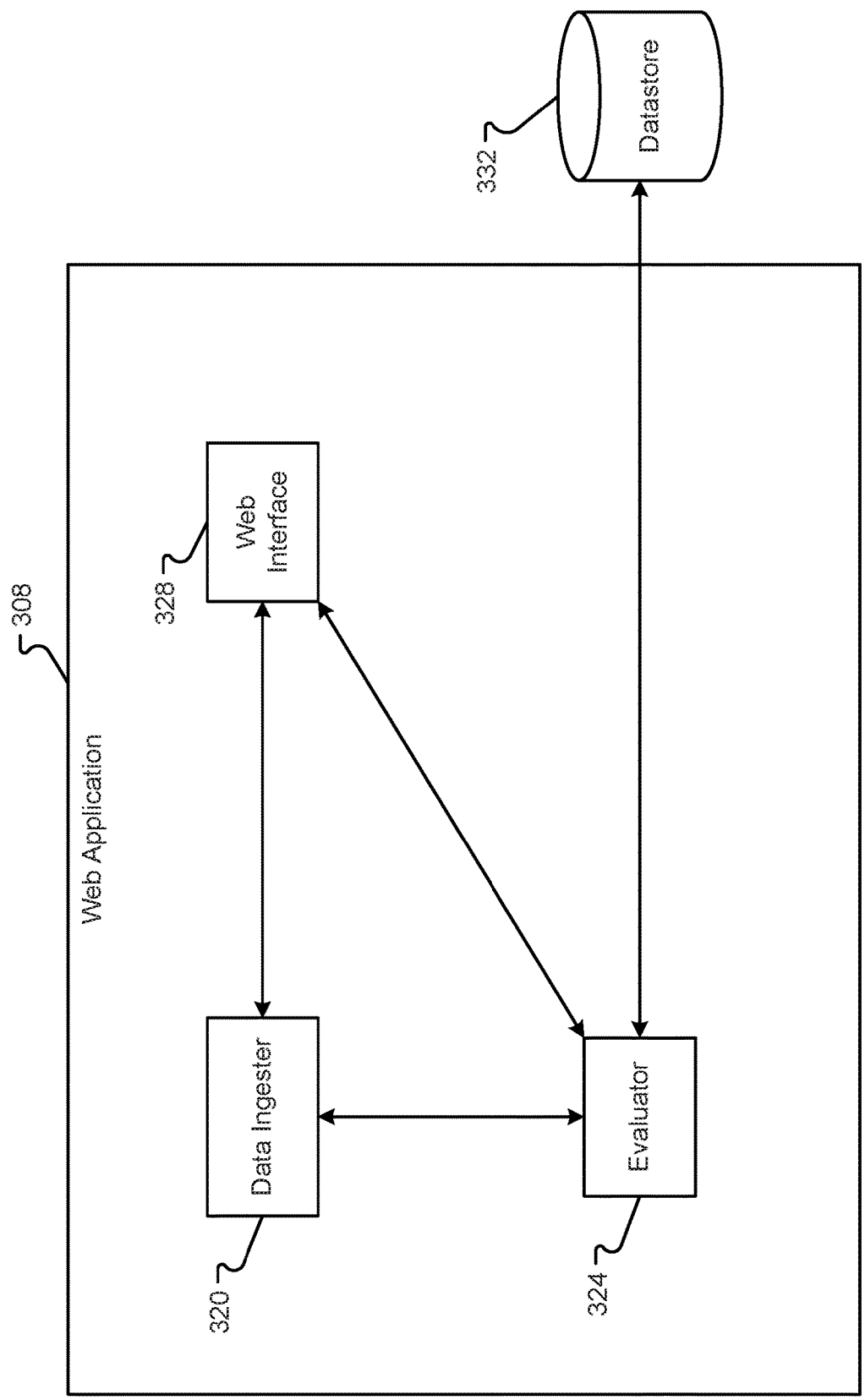
FIG. 3B is a block diagram of a web application installed on a server.

Embodiments of the server 112 may be as shown in FIGS. 3A and 3B. The server 112 can include a web server 304, a web application 308, one or more applications 312, and one or more resources 316. The web server 304 may provide the web pages or serve those pages to the device 104 from the server 112. Thus, the web server 304 can be the interface to the web server 304 or to the server 112 from the device 104. The web server 304 may be in communication with one or more web applications 308, one or more apps 312, or one or more resources 316.

Web applications 308 are applications that may be executed at the server 112 but provide resources or content processing capability to the devices 104. The web application 308 may have an interface with the device 104 instead of accessing or communicating through the web server 304.

Apps 312 may be applications or software executed at the server level 112 that may communicate through the web server 304. Thus, the apps 312 differ from web applications 308, as apps 312 provides content to the web server 304, but the web server 304 provides pages or that information from the apps 312 to the server 104. The apps 312 can provide functionality as described in conjunction with apps 212, yet apps 312 are executed at the server 112. One or more apps 312 may be duplicates of apps 212.

The web server 304 can include a portal interface 306. A portal interface 306 can assist in determining which device/server application or service should be used with a server service (e.g., a voice call) and what can be customized by the administrator through management interface settings that are instituted by the portal interface 306. For example, the portal interface 306 provides a management interface on the server 112 that allow an administrator to control the priority for launching client services or functions. Thus, the portal interface 306 may choose or determine which of the multiple ways a local device can join the service (e.g., server conference call) and set the functions for that service. Thus, the portal interface 306 allows for customization on the server 112 without any device 104 changes because the default logic for changing the device 104 may not fit every environment or user's deployment needs.

Resources 316 may provide similar resources to those resources described in conjunction with resources 216. The resources 316 may not be full apps 312, but may provide functionality such as teleconferencing, video conferencing, access to different hardware, etc.

An embodiment of the web application 308 may be as shown in FIG. 3B. This particular web application 308 can include a data ingester 320, an evaluator 324, a web interface 328, and a data store 332. The data ingester 320 can include any software or hardware capable of receiving data from the data modeler 224 through the browser interface 228. This data ingester 320 may store the data in the data store 332. Thus, the data ingester 320 can create an instance of the data provided from the device 104, either temporarily or permanently, in data store 332. The data ingester 320 may also retrieve data from the data store 332 and provide that data to the evaluator 324. The data ingester 320 may store the data in the format provided by the device 104 or adjust the format for the needs of the evaluator 324. The data ingester 320 may also review data about apps 312 and resources 316 at the server level 112. The evaluation information may also be stored in data store 332. Similar to the data modeler 224, the data ingester 320 may provide information about the apps 312 and resources 316 such as the type, version, capabilities, etc. This information may also be stored in a data store 332 for provision to the evaluator 324.

The evaluator 324 may evaluate data both about the device 104 and the server 112 to determine the most optimal environment to conduct some process or provide some capability. Thus, the evaluator 324 may receive the data from the data store 332 through the data ingester 320. The evaluator 324 may then conduct one or more comparisons about the apps 212, 312 or resources 216, 316 available on the device 104 and server 112, whether those apps 212, 312 or resources 216, 316 can or need to be updated either at the server 112 or the device 104, and which of those capabilities should be used further at the device 104 or at the server 112. Thus, the evaluator 324 can compare the apps 212, 312 or resources 216, 316, their versions and capabilities, and compare that to the request provided by the device 104 to determine which apps 312, 212, or resource 216, 316 may be used to provide the needed functionality. This determination may then be provided to the web interface 328 as a URI to link to the chosen app 212, 312 and/or resource 216, 316.

The web interface 328 may communicate through the web server 304 directly with the browser interface 228 of the device 104. The web interface 328 can receive requests for functionality from the device 104, and provide the URI as provisioned from the determination by the evaluator 324 to the device 104. The URI may then be selected, which can redirect the device 104 to a capability in apps 212, 312, or resource 216, 316, either at the device 104 or at the server 112. If accessing a resource at the server 112, the web interface 328 may receive the redirection from the URI either directly or through the web server 304, which may then conduct operations to execute the apps 312 or provide the resource 316.

Figure 4A:
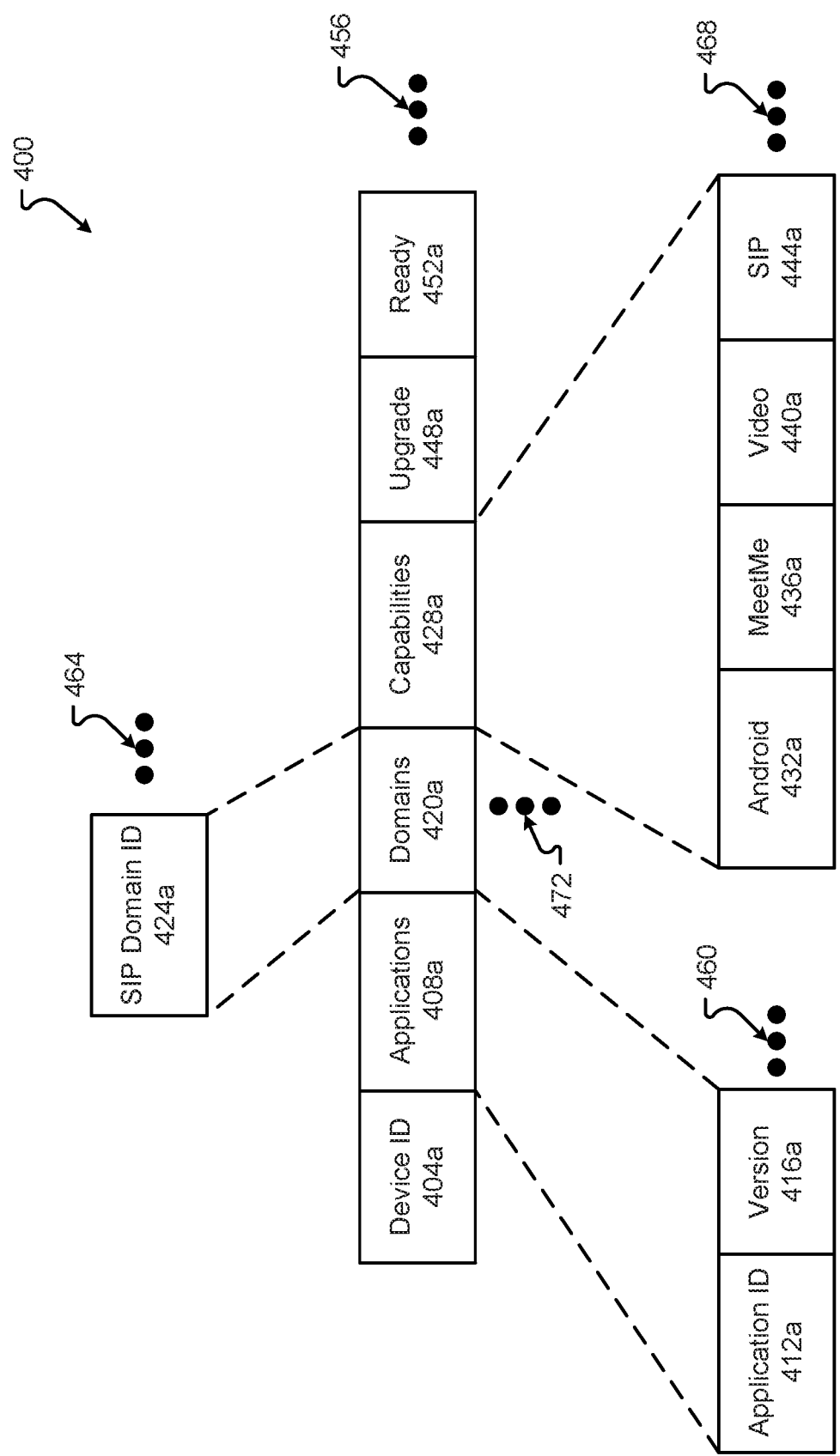
FIG. 4A is a diagram depicting embodiments of data that describe the capabilities of a device.

An embodiment of data 400 that may be stored either in the data store 232 or data store 332 providing information about resources or capabilities of the device 104 may be as shown in FIG. 4A. The data 400 may be stored in one or more fields or portions. The fields or portions may include one or more of, but are not limited to, a device identifier 404, an application section 408, a domains section 424, a capabilities section 428, upgrade information 448, and/or ready information 452. The data structure 400 can include more or fewer fields and information, as represented by ellipses 456.

The device identifier 404 can be any type of identifier including an alphanumeric globally unique identifier (GUID), etc. The device identifier 404 is unique to the device that may be in contact with the server 112. The apps field 408 may include any type of data or metadata about the apps 212 available at the device 104. For example, the apps field 408 may include an application ID 412, a version field 416, and one or more other fields as represented by ellipses 460. The application ID 412 can be any type of identifier that uniquely identifies the apps 212, including an application name, an application alphanumeric ID, a GUID, or some other type of identifier. The version field 416 can include any type of version for the apps 212. The version 416 can include such things as a numeric version, such as 5.3, or may include separate name or other types of version identifiers. For each apps 212 in the field 408, there may be a separate application ID 412 and version ID 416, and other data. Thus, the application field 408 can represent two or more applications available on the device 104. The domains field 420 can include any type of domains that may be accessed or used by the device 104. Domains 420 can include such fields as a SIP domain ID 424, or other IDs as represented by ellipses 464. The SIP domain ID 424 can indicate which SIP domain is used for communication by the device 104. This domain ID 420 may also indicate a capability of the device 104.

Capabilities field 428 can include fields for capabilities of the device 104. These capabilities 428 can include such things as hardware and/or driver identifiers and versions. The hardware can indicate the ability to perform certain tasks, such as video conferencing. The capabilities can also include software information with reference to different types of resources or capabilities. For example, the capabilities 428 can include such information as the Android version and identifier 432, a meet-me identifier 436, video conferencing information 440, SIP information 444, and other information, as represented by ellipses 468. The information within these fields 432 through 444 can include any type of identifier for a hardware system, such as, a video camera, a hard drive, etc. Further, information 428 can include driver versions and IDs. The information 428 may also include the IDs of other applications that are not included in the applications field 408, and any other metadata to determine the capabilities of the device.

An upgrade field 448 may represent whether or not an upgrade may be available for a capability or apps 212. The upgrade field information 448 may be information either determined by the device 104 or provided by the server 112. This upgrade 448 can also be a determination of whether or not the device 104 needs to upgrade some type of apps 212 or capability. The ready field 452 can indicate whether or not the device 104 is ready for communication or action, or may be ready to perform communications with the capabilities application 200 to provide the server 112 with information about the device's capabilities.

Figure 4B:
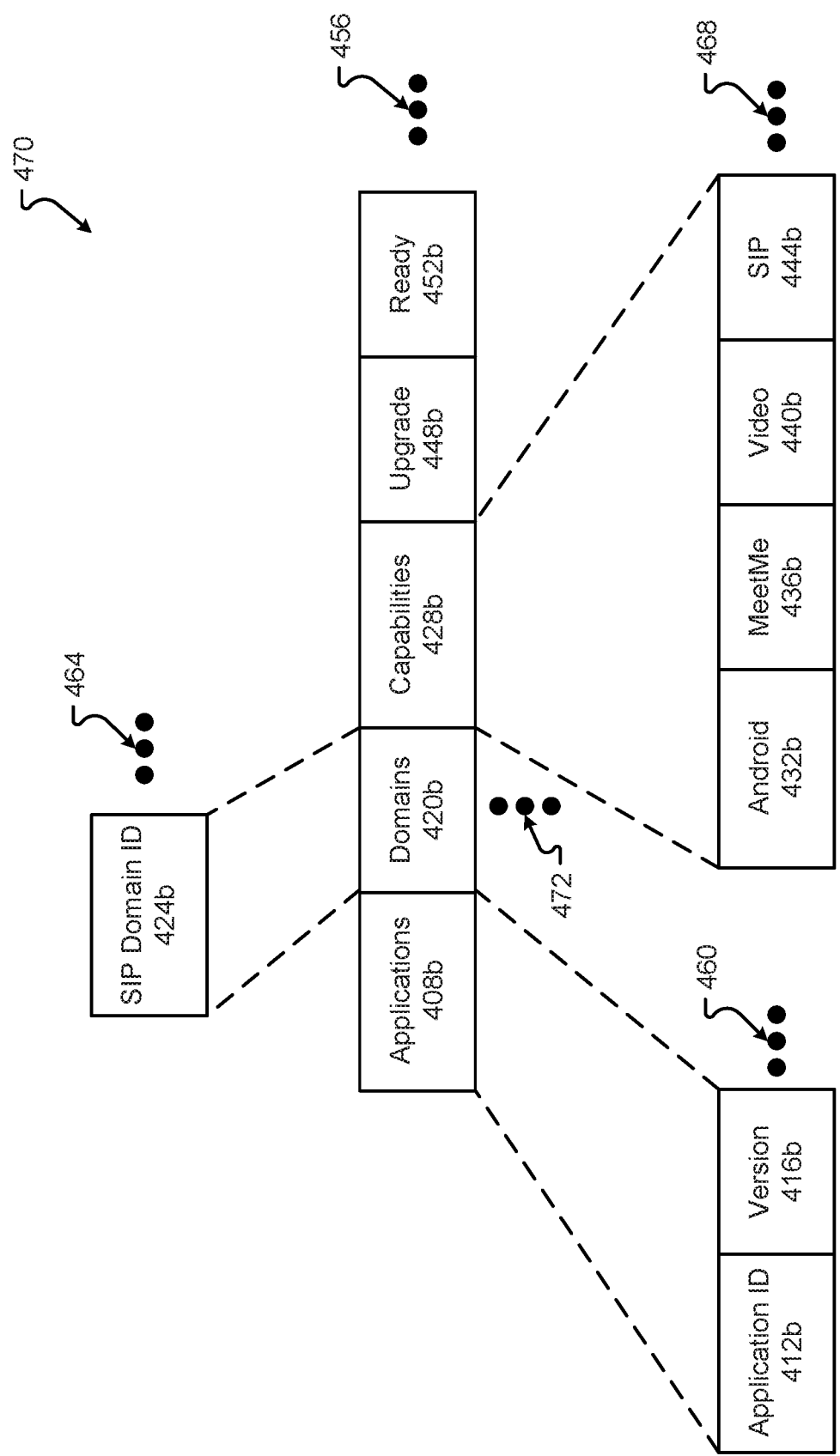
FIG. 4B is a diagram depicting embodiments of data that describe the capabilities of a server.

An embodiment of information 470 in a data store 332 that may be associated with the server 112 may be as shown in FIG. 4B. Here, the information 470 is generally the same or similar to that provided in FIG. 4A only information 476 describes the server 112, and thus, may not be described again herein.

Figure 5:
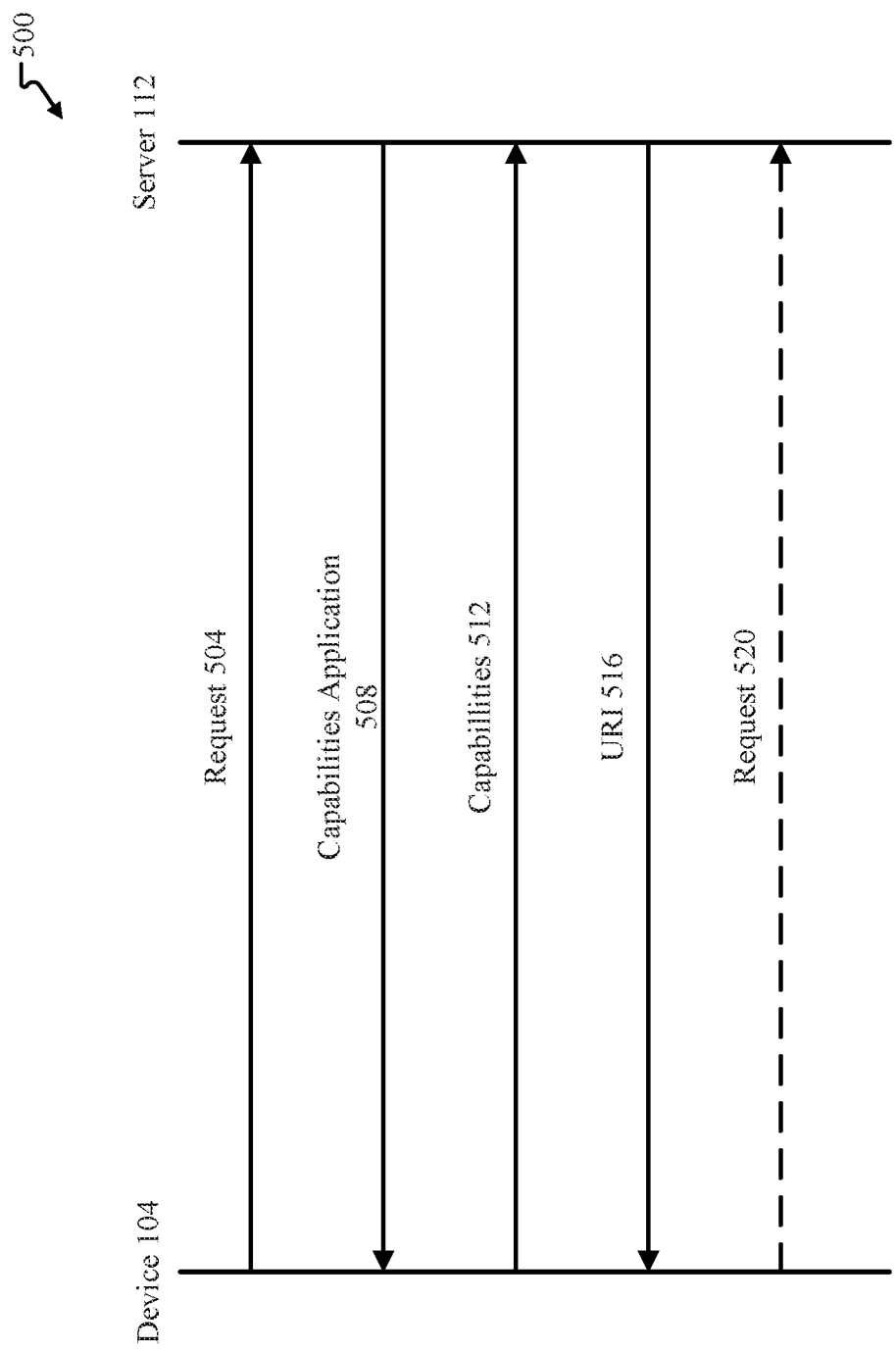
FIG. 5 is a diagram depicting embodiments of a signaling exchange generally directed to communications between a device and a server.

A communication diagram 500 between the device 104 and server 112 may be as shown in FIG. 5. The device 104 may send a request 504 to the server 112. The request 504 can include a request for a function or resource. For example, the request 504 may be a request for a teleconference or video conference or some other type of activity. The server 112 may return a capabilities application message 508. The capabilities application 508 message may include a directive to execute a capabilities application 208 on the device 104. In other situations, the capabilities application message 508 can include code for the capabilities application 208 and a directive to install and then execute the capabilities application 208. After the capabilities application 208 is executed, the device 104 can send a capabilities message 512 to the server 112. The capabilities message 512 may include the capabilities, associated with the request 504, of the device 104, as described in conjunction with FIG. 4A. The server 112 may then make some determination about where to best execute the activity and send a URI message 516 to the device 104. The URI message 516 can include a URI that indicates where and which apps 212, 312 or resource 216/316 should be used to fulfill the request 504. If the URI instructs the device 104 to execute a resource or capability on a server 112, the device 104 may send a resource request 520, which is optional, to the server 112. The resource request 520 can then cause the server 112 to execute apps 312 or some resource and provide functionality to the device 112 over the network 108.

Figure 6:
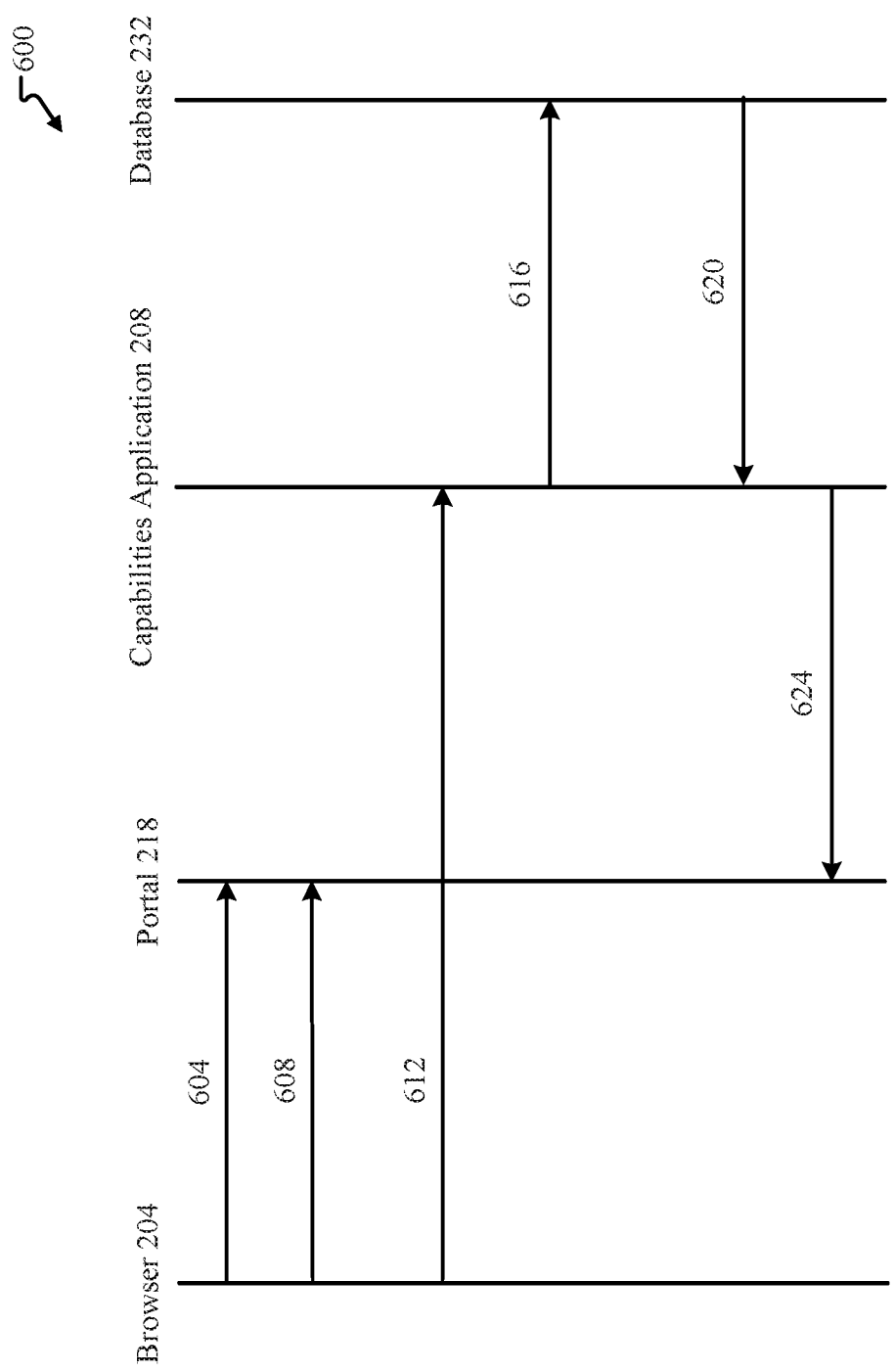
FIG. 6 is a diagram depicting embodiments of a signaling exchange generally directed to communications between a web browser and a capabilities application.

An embodiment of internal communications 600 within the device 104 may be as shown in FIG. 6. Here, the communications 600 may start by the browser 204 sending a retrieval for a portal page request to the portal 218 in message 604. The browser interface 228 may also request an establishment of a session with the portal 218 in message 608. An evaluation phase may be conducted to determine if a capabilities application 208 is provided, and sometime thereafter, session information from the browser 204 describing the session and the ID of the session may be sent through the portal 218 to the capabilities application 208 in message 612. The capabilities application 208 may then access in message 616, through the data modeler 224, capabilities stored in the database 232, which may be the same or similar to the information explained or described in conjunction with FIG. 4A. The message 620 back from the database 232 to the data modeler 224 may include this information about the capabilities. A message 620 from the data modeler to the capabilities application 208 may include the capabilities in a format understood by the capabilities application 208. The capabilities may then be sent on through the portal 624 on to the server 112 in message 624.

Figure 7:
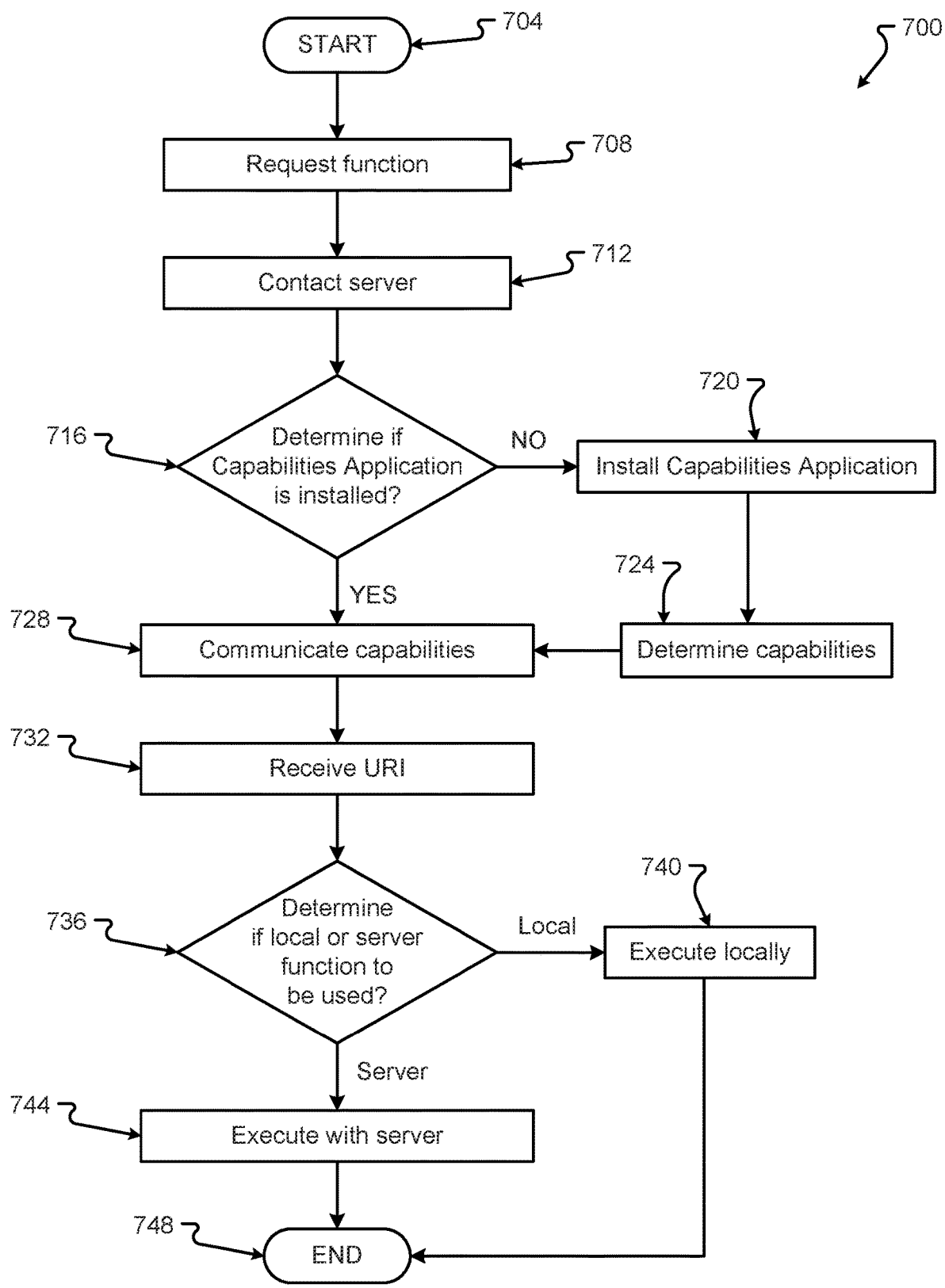
FIG. 7 is a flow diagram of an embodiment of a method generally directed to determining whether to execute a function on a local device, a server, and/or a cloud resource.

An embodiment of a method 700 conducted at the device 104 for providing capabilities either locally or at the server may be as shown in FIG. 7. The method 700 may start at step 704. The device 104, through the browser 204 may request a function or capability, in Step 708. Here, the request for the function may be sent as a message 504 from the device 104 to the server 112. This request may be sent by the browser 204 to the web server 304 of the server 112. The server 112 may respond with the message 508 that is received, in step 712. This message 504 may indicate that a capabilities application needs to be executed at the device 104. Thus, the device 104 determines if a capabilities application 208 has been executed and installed in step 716. If a capabilities application 208 has been installed, the method 700 proceeds YES to step 728. However, if a capabilities application 208 has not been installed, the method 700 proceeds NO to step 720.

In step 720, the device 104 executes or installs the capabilities application 208. If no capabilities application 208 has been installed and no code is available, the server 112 may send, in message 508 or in a subsequent message, the code for the capabilities application 208. This code may then be installed by the device processor 105, and the capabilities application 208 may be executed in step 720.

Upon installing and executing the capabilities application 208, the capabilities application 208 can determine the capabilities of the device 104, in step 724. Here, the scanner 220, of the capabilities application 208 may scan for the apps 212 and resources 216 of the device 104. The scanner may also conduct other operations to determine information about the device 104. This information will be the same or similar to that described in conjunction with FIG. 4A. This information may be stored in data store 232, and then communicated to a data modeler 224 for provision to the browser interface 228.

In step 728, the browser interface 228 can communicate the capabilities of the device 104, either as stored or determined by the data modeler 224. This communication of capabilities may be sent in message 512 to the server 112. The capabilities can be associated with the request or form an overview of all capabilities of the device 104. Any of the information may be the same or similar to that as described in conjunction with FIG. 4A. After determination by the server 112 as to where to execute or provide the functionality, the browser 204 may receive a URI from the server 112, in step 732. The URI may be provided in message 516 from the server 112. The URI may be extracted and/or followed from and/or followed by the message and/or followed by browser interface 220 or the capabilities application 208 and then the resource may be executed or instantiated. The capabilities application 208 may determine, in step 736, whether the URI is local or directed to the server 112. If the URI is directed to a local resource, the capabilities application 208 can help execute the application, in step 740. Thus, the local apps 212 or resource 216 may be executed and provide the functionality to the device 104 locally. However, in contrast, if the resource directs the device 104 to an application or resource at the server 112, the resource URI may direct a resource request 520 to the server 112 to execute the apps 312 or resource 316 at the server 112, in step 744. The functionality may then be provided during the session either locally or on the server. The method 700 may end at step 748.

Figure 8:
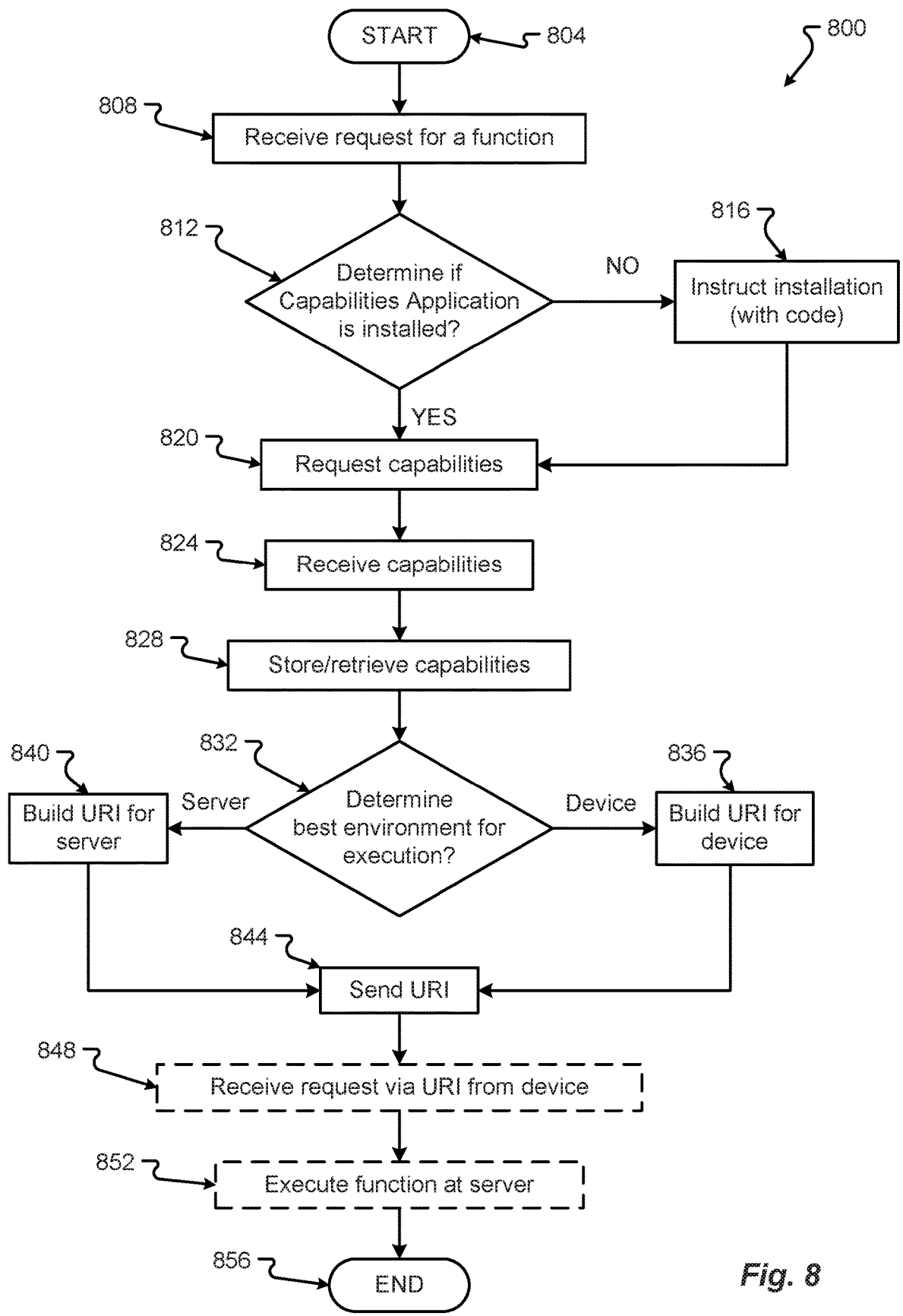
FIG. 8 is another flow diagram of an embodiment of a method generally directed to determining whether to execute a function on a local device, a server, and/or a cloud resource.

An embodiment of a method 800 as executed at the server 112 for providing a functionality to a device 104 may be as shown in FIG. 8. The method 800 may begin at step 804. Here, the server 112 may receive a request for a functionality, in step 808. The request may be in the form of a message 504 sent from the device 104 to the server 112. The request may include information about the device 104, for instance, if a capabilities application 208 is available at the device 104. From this information, the server 112 may determine if a capabilities application 208 has been installed and may be executed on device 104 in step 812. If no capabilities application 208 has been installed at the device 104, the method 800 proceeds NO to step 816. If a capabilities application 208 has been installed or is executing, the method 800 proceeds YES to step 820.

In step 816, the web application 308 may provide the code for the capabilities application 208 to the web server 304, which sends the message 508 to the device 104. The message 508 may be directed to either execute or install the capabilities application 208. If no capabilities application 208 has been installed, the code provided, by the web app 308, may be used to install the capabilities application 208 at the device 109.

The web application 308, via the data ingester 320, may then request the capabilities of the device 104, in step 820. The request may be part of the capabilities application message 504 or a separate message. This request can request capabilities directly associated with the requested functionality, in step 808, or may be a request for all capabilities or at least some portion of capabilities of the device 104. In response to the request, the server 112, particularly the data ingester 320, can receive the requested capabilities, in step 824. Here, the data ingester 320 may receive the capabilities through the web interface 328. The data ingester 320 may store this information in data store 332, and provide the information to the evaluator 324. The data ingester 320 stores and retrieves this information, in step 828. Further, the data ingester 320 can retrieve both information about the device 104 and the server 112 to provide to the evaluator 324. The information provided to the evaluator 324 may be similar to that described in conjunction with FIGS. 4A and 4B.

The evaluator 324 may, at step 832, then determine which is the best environment for providing the functionality requested in step 808. If the device 104 is the best environment, the method 800 proceeds to step 836. If the server 112 is the best environment, the method 800 proceeds to step 840. In step 836, the evaluator 324 may create a URI for the functionality at the device 104 to provide that URI to the device 104 in a separate message. If the server 112 is the best environment to execute the functionality, the evaluator 324 can create a URI for a resource or application at the server 112 and provide that information to the web interface 328. At step 844, the web interface 328 may include the URI into a message to send through the web server 304 to the device 104. This URI message 516 may be sent from the server 112 to the device 104. If the URI is directed to functionality at the server 112, the web server 304 may receive a request, via the URI, the functionality, in step 848. The request may then direct the web interface 328 to access apps 312, resource 316, or some other functionality, and execute that functionality, in step 852, for use by the device 104. The method 800 may end at step 856.

FIG. 9 illustrates a block diagram of a computing environment 900 that may function as the servers, user computers, or other systems provided and described above. The environment 900 includes one or more user computers 905, 910, and 915. The user computers 905, 910, and 915 may be general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These user computers 905, 910, 915 may also have any of a variety of applications, including for example, database client and/or server applications, and web browser applications. Alternatively, the user computers 905, 910, and 915 may be any other electronic device, such as a thin-client computer, Internet-enabled mobile telephone, and/or personal digital assistant, capable of communicating via a network 920 and/or displaying and navigating web pages or other types of electronic documents. Although the exemplary computer environment 900 is shown with three user computers, any number of user computers may be supported.

Environment 900 further includes a network 920. The network 920 may can be any type of network familiar to those skilled in the art that can support data communications using any of a variety of commercially-available protocols, including without limitation SIP, TCP/IP, SNA, IPX, Apple-Talk, and the like. Merely by way of example, the network 920 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.9 suite of protocols, the Bluetooth® protocol known in the art, and/or any other wireless protocol); and/or any combination of these and/or other networks.

The system may also include one or more server 925, 930. In this example, server 925 is shown as a web server and server 930 is shown as an application server. The web server 925, which may be used to process requests for web pages or other electronic documents from user computers 905, 910, and 915. The web server 925 can be running an operating system including any of those discussed above, as well as any commercially-available server operating systems. The web server 925 can also run a variety of server applications, including SIP servers, HTTP servers, FTP servers, CGI servers, database servers, Java servers, and the like. In some instances, the web server 925 may publish operations available operations as one or more web services.

The environment 900 may also include one or more file and or/application servers 930, which can, in addition to an operating system, include one or more applications accessible by a client running on one or more of the user computers 905, 910, 915. The server(s) 930 and/or 925 may be one or more general purpose computers capable of executing programs or scripts in response to the user computers 905, 910 and 915. As one example, the server 930, 925 may execute one or more web applications. The web application may be implemented as one or more scripts or programs written in any programming language, such as Java™, C, C#®, or C++, and/or any scripting language, such as Perl, Python, or TCL, as well as combinations of any programming/scripting languages. The application server(s) 930 may also include database servers, including without limitation those commercially available from Oracle, Microsoft, Sybase™, IBM™ and the like, which can process requests from database clients running on a user computer 905.

The web pages created by the server 925 and/or 930 may be forwarded to a user computer 905 via a web (file) server 925, 930. Similarly, the web server 925 may be able to receive web page requests, web services invocations, and/or input data from a user computer 905 and can forward the web page requests and/or input data to the web (application) server 930. In further embodiments, the web server 930 may function as a file server. Although for ease of description, FIG. 9 illustrates a separate web server 925 and file/application server 930, those skilled in the art will recognize that the functions described with respect to servers 925, 930 may be performed by a single server and/or a plurality of specialized servers, depending on implementation-specific needs and parameters. The computer systems 905, 910, and 915, web (file) server 925 and/or web (application) server 930 may function as the system, devices, or components described in FIGS. 1-3B.

The environment 900 may also include a database 935. The database 935 may reside in a variety of locations. By way of example, database 935 may reside on a storage medium local to (and/or resident in) one or more of the computers 905, 910, 915, 925, 930. Alternatively, it may be remote from any or all of the computers 905, 910, 915, 925, 930, and in communication (e.g., via the network 920) with one or more of these. The database 935 may reside in a storage-area network ("SAN") familiar to those skilled in the art. Similarly, any necessary files for performing the functions attributed to the computers 905, 910, 915, 925, 930 may be stored locally on the respective computer and/or remotely, as appropriate. The database 935 may be a relational database, such as Oracle 20i®, that is adapted to store, update, and retrieve data in response to SQL-formatted commands.

FIG. 10 illustrates one embodiment of a computer system 1000 upon which the servers, user computers, or other systems or components described above may be deployed or executed. The computer system 1000 is shown comprising hardware elements that may be electrically coupled via a bus 1055. The hardware elements may include one or more central processing units (CPUs) 1015; one or more input devices 1010 (e.g., a mouse, a keyboard, etc.); and one or more output devices 1015 (e.g., a display device, a printer, etc.). The computer system 1000 may also include one or more storage devices 1020. By way of example, storage device(s) 1020 may be disk drives, optical storage devices, solid-state storage devices such as a random access memory ("RAM") and/or a read-only memory ("ROM"), which can be programmable, flash-updateable and/or the like.

The computer system 1000 may additionally include a computer-readable storage media reader 1025; a communications system 1030 (e.g., a modem, a network card (wireless or wired), an infra-red communication device, etc.); and working memory 1040, which may include RAM and ROM devices as described above. The computer system 1000 may also include a processing acceleration unit 1035, which can include a DSP, a special-purpose processor, and/or the like.

The computer-readable storage media reader 1025 can further be connected to a computer-readable storage medium, together (and, optionally, in combination with storage device(s) 1020) comprehensively representing remote, local, fixed, and/or removable storage devices plus storage media for temporarily and/or more permanently containing computer-readable information. The communications system 1030 may permit data to be exchanged with a network and/or any other computer described above with respect to the computer environment 2000. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 1000 may also comprise software elements, shown as being currently located within a working memory 1040, including an operating system 1045 and/or other code 1050. It should be appreciated that alternate embodiments of a computer system 1000 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 1005 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

The exemplary systems and methods of this disclosure have been described in relation to executing functions in disparate environments. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others. The present disclosure can provide a number of advantages depending on the particular configuration. For example, the system allows for the executing functions in the most optimal environment. Thus, the embodiments use either a device or server to complete a function or operation in a way to speed both device and server while meeting the user's needs. These and other advantages will be apparent from the disclosure contained herein.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 202(f) and/or Section 202, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method comprising:
sending, by a first computer system, a request for a function to a server;
receiving, by the first computer system, a directive from the server to execute a capabilities application in response to the request for the function;
determining, by the capabilities application, first information associated with the first computer system, wherein the first information comprises information relating to one or more of software installed on the first computer system, drivers installed on the first computer system, hardware of the first computer system, and an operating system of the first computer system;
sending the first information to the server;
receiving, from the server and in response to the first information, a uniform resource locator (URL) based on a comparison of the first information and second information to determine an optimal operating environment for executing the function, wherein the second information is associated with one or more capabilities of the server, wherein the URL identifies the optimal operating environment; and
based on the received URL, one of:
   executing the function locally at the first computer system; and
   sending a request to the server requesting the server to execute the function.

2. The method according to claim 1, wherein the URL instructs the first computer system to execute the function locally at the first computer system.

3. The method according to claim 1, wherein the URL instructs the first computer system to send the request to the server.

4. The method according to claim 1,
wherein the capabilities application executed by the first computer system interfaces with the operating system of the first computer system to determine the first information.

5. The method according to claim 1, further comprising:
receiving, by the first computer system, code for installing the capabilities application.

6. The method according to claim 1, wherein the capabilities application provides the first information to the server through a portal to a web browser.

7. The method according to claim 1, wherein the capabilities application includes a scanner that retrieves third information, wherein the third information is associated with an application and a resource.

8. The method according to claim 7, wherein the capabilities application stores the third information at a datastore on the first computer system.

9. The method according to claim 8, wherein the third information includes one or more of: a device identifier, an application identifier, an application version, a domain identifier, a capability, an upgrade requirement, and a ready indication.

10. The method according to claim 9, wherein the capabilities application retrieves at least some of the information about the application and the resource stored in the datastore from the datastore to send to the server.

11. A server computer system comprising:
a memory;
a processor in communication with the memory, the processor operable to:
   receive a request for a function from a first computer system;
   in response to the request for the function from the first computer system, send a directive to the first computer system, wherein the directive instructs the first computer system to execute a capabilities application;
   receive first information, wherein the first information is associated with the first computer system, wherein the first information comprises information relating to one or more of software installed on the first computer system, drivers installed on the first computer system, hardware of the first computer system, and an operating system of the first computer system;
   compare the first information and second information, wherein the second information is associated with one or more capabilities of the server computer system, to determine an optimal operating environment for executing the function;
   based on the comparison, generate a uniform resource locator (URL) identifying the optimal operating environment; and
   send the URL to the first computer system, wherein the URL instructs the first computer system to one of execute the function locally at the first computer system and send a request to the server to request the function to be executed by the server computer system.

12. The server computer system according to claim 11, wherein the URL instructs the first computer system to execute the function locally at the first computer system.

13. The server computer system according to claim 12, wherein the processor is further operable to:
send, to the first computer system, a directive to install the capabilities application; and
send, to the first computer system, code for installing the capabilities application;
wherein the capabilities application interfaces with an operating system (OS) at the first computer system to determine the first information, and wherein the capabilities application provides the first information to the server computer system.

14. The server computer system according to claim 12, further comprising a datastore, and wherein the processor is further operable to:
store the first information and the second information in the datastore, wherein at least one of the first information and the second information stored in the datastore includes one or more of: a device identifier, an application identifier, an application version, a domain identifier, a capability, an upgrade requirement, and a ready indication.

15. The server computer system according to claim 14, wherein the processor is further operable to retrieve at least some of the first information and the second information from the datastore.

16. A non-transitory computer readable medium having stored thereon instructions that cause a processor of a server to execute a method, the method comprising:
receiving a request for a function from a first computer system;
in response to receiving the request for the function from the first computer system, sending a directive to the first computer system, wherein the directive instructs the first computer system to execute a capabilities application;
receiving first information associated with the first computer system, wherein the first information comprises information relating to one or more of software installed on the first computer system, drivers installed on the first computer system, hardware of the first computer system, and an operating system of the first computer system;
comparing the first information and second information to determine an optimal operating environment for executing the function, wherein the second information is associated with one or more capabilities of the server;

based on the comparison, generating a uniform resource locator (URL) identifying the optimal environment; and sending the URL to the first computer system, wherein the URL instructs the first computer system to one of execute the function locally at the first computer system and send a request to the server requesting the function to be executed by the server.

17. The medium according to claim 16, wherein the URL instructs the first computer system to execute the function locally at the first computer system.

18. The medium according to claim 16, wherein the URL instructs the first computer system to send the request to the server.

19. The medium according to claim 16, wherein the capabilities application interfaces with an operating system of the first computer system to determine the first information.

20. The medium according to claim 17, wherein the capabilities application stores the first information at a datastore on the first computer system, wherein the first information stored in the datastore includes one or more of: a device identifier, an application identifier, an application version, a domain identifier, a capability, an upgrade requirement, and a ready indication.

* * * * *